United States Patent [19]

Tanaka et al.

[11] Patent Number: 5,895,516
[45] Date of Patent: Apr. 20, 1999

[54] BEARING ALLOY FOR HIGH-TEMPERATURE APPLICATION

[75] Inventors: Tadashi Tanaka; Masaaki Sakamoto; Koichi Yamamoto; Kouki Ozaki, all of Nagoya, Japan

[73] Assignee: Daido Metal Company Ltd., Nagoya, Japan

[21] Appl. No.: 08/686,455

[22] Filed: Jul. 25, 1996

Related U.S. Application Data

[63] Continuation of application No. 08/421,895, Apr. 14, 1995, abandoned.

[30] Foreign Application Priority Data

Apr. 21, 1994 [JP] Japan ................................. 6-107965

[51] Int. Cl.⁶ .......................... C22C 29/00; B22F 9/00
[52] U.S. Cl. ......................... 75/243; 75/246; 384/912
[58] Field of Search .......................... 75/247, 255, 252, 75/243, 244, 246; 148/410; 384/912

[56] References Cited

U.S. PATENT DOCUMENTS

| 3,494,709 | 2/1970 | Pieracy . | |
|---|---|---|---|
| 4,471,030 | 9/1984 | Furuoka et al. | 148/417 |
| 4,566,810 | 1/1986 | Yoshioka et al. | 384/912 |
| 5,298,052 | 3/1994 | Tanaka et al. | 75/243 |

FOREIGN PATENT DOCUMENTS

| 30 29 420 | 3/1982 | Germany . |
| 42 15 851 | 1/1993 | Germany . |
| 0017839 | 1/1993 | Japan . |

*Primary Examiner*—Margery Phipps
*Attorney, Agent, or Firm*—Browdy and Neimark

[57] ABSTRACT

A bearing alloy for high-temperature application essentially consisting of, by weight, 2 to 8% Cr, 2 to 10% Fe, 0.1 to 1.5% Si, 2 to 22% Co, 1.4 to 11% Mo, and the balance of Ni and unavoidable impurities, and having a structure in which hard particles of a Co—Mo—Cr—Si-system intermetallic compound are dispersed the matrix in the proportion of 5 to 35 weight percent to the matrix. The respective component of the intermetallic compound is also counted in the above alloy composition.

12 Claims, No Drawings

BEARING ALLOY FOR HIGH-TEMPERATURE APPLICATION

This application is a continuation of application Ser. No. 08/421,895 filed Apr. 14, 1995, now abandoned.

BACKGROUND OF THE INVENTION

1. Field of the Invention

The present invention relates to a bearing alloy for high-temperature application which is used in an oxidizing atmosphere at high temperature.

2. Technical Background

Conventional bearings for high-temperature application, especially bearings in exhaust gas control valves of gasoline or diesel engines, variable valves of gas turbines, and so forth, are used in an oxidizing atmosphere at a temperature exceeding 700° C. There has been an increasing demand for a bearing alloy which can be suitably used in an oxidizing atmosphere at such a high temperature. In order to satisfy the demand, the inventors of the present application suggested a bearing alloy which can be used even at 900° C., as disclosed in JP-A-5-17839.

The known bearing alloy consists of, by weight, 9 to 30% Cr, 5 to 19% Fe, 0.1 to 1.5% Si, 2 to 22% Co, 1.4 to 11% Mo, and the balance of Ni and unavoidable impurities, and has a structure in which hard particles of a Co—Mo—Cr—Si-system intermetallic compound are dispersed in the alloy matrix. Further, according to JP-A-5-17839, in order to improve oxidation resistance of the known bearing alloy, it is essential to sinter a green compact of a powder thereof and subsequently hot-compress it to increase the density thereof. When the mating material is an Ni-base heat resisting alloy of the precipitation hardening type, the bearing alloy exhibits excellent sliding properties because of the hardness as high as Hv 300 to 500. However, for example, when a soft mating material such as austenitic stainless steel of Hv 100 to 300 is used, wear loss of the mating material increases in spite of the fact that the friction coefficient is low, which results in a problem of deterioration in durability owing to wear of the mating material. Moreover, in the manufacturing process of the known bearing alloy, the density must be increased by hot-compressing so as to improve oxidation resistance, which makes the process complicated.

It is therefore an object of the present invention to provide a bearing alloy for high-temperature application which scarcely wears a mating material even if the mating material is soft and has a hardness not higher than Hv 300, which bearing alloy has excellent oxidation resistance without increasing the density by hot-compressing and can be easily manufactured.

SUMMARY OF THE INVENTION

According to a first feature of the invention, there is provided a bearing alloy consisting of, by weight, 2 to 8% Cr, 2 to 10% Fe, 0.1 to 1.5% Si, 2 to 22% Co, 1.4 to 11% Mo, and the balance of Ni and unavoidable impurities, the bearing alloy having a structure in which hard particles of a Co—Mo—Cr—Si-system intermetallic compound are dispersed in the matrix in a proportion of 5 to 35 weight percent to the matrix.

1) The Cr content is limited to 2 to 8% on the ground that if it is less than 2%, oxidation resistance of the matrix is inadequate, and if it is more than 8%, the rate of powder compression can not be increased, and a sintered material of high density can not be obtained. Therefore, considering the oxidation resistance deteriorating at high temperature, the Cr content is 2 to 8%. Preferably, it is 5 to 7% in consideration of forming property and oxidation resistance.

2) The Fe content is limited to 2 to 10% on the ground that if it is less than 2%, the high temperature strength is inferior, and if it is more than 10%, powder used for the alloy becomes hard, and the compression ratio of the powder can not be increased resulting in that a sintered material of the alloy can not have a high density and thus the oxidation resistance is deteriorated. Consequently, the Fe content is 2 to 10%, preferably, 4 to 6% because the high temperature strength and the oxidation resistance are more excellent.

3) An amount of hard particles of the Co—Mo—Cr—Si-system intermetallic compound is limited to 5 to 35 weight percent in the matrix on the ground that if it is less than 5%, the sliding properties is not satisfactorily improved at high temperature, and if it is more than 35%, forming property of powder becomes inferior, and also, the alloy becomes hard, thereby increasing wear loss of a mating shaft during sliding movement. Further, the hard particles of the Co—Mo—Cr—Si-system intermetallic compound must be dispersed in the matrix. It is preferable that the hard particles having a size of 100 to 200 μm are dispersed uniformly in the matrix.

The hard particles of the Co—Mo—Cr—Si-system intermetallic compound has the close-packed hexagonal crystal structure, which consists of by weight, 26 to 30% Mo, 7.5 to 9.5% Cr, 2.4 to 2.6% Si, and the balance of Co and improves the sliding properties of the alloy. In order to form the Co—Mo—Cr—Si-system hard particles of the close-packed hexagonal crystal structure, the elements of Si, Co and Mo should be contained in the whole alloy as follows: 0.1 to 1.5% Si, 2 to 22% Co, and 1.4 to 11% Mo.

According to a second feature of the invention, the bearing alloy according to the first feature further comprises 1.5 to 5 weight percent BN. When BN content is not less than 1.5%, the powder is restrained to seize to dies during powder forming. However, as the content of BN increases, the alloy becomes softer, and also, when the temperature exceeds 700° C., the oxidation resistance decreases. Therefore, the BN content is limited to 1.5 to 5%.

According to a third feature, there is a combination of a bearing and a shaft, in which the bearing is formed of the bearing alloy according to the first or second feature and the shaft has a hardness of Hv 100 to 300 which is supported by the bearing. According to the combination, the bearing well operates as a sliding material at a high-temperature with a smaller wear loss of the mating shaft.

DETAILED DESCRIPTION OF THE INVENTION

According to the first feature of the invention, the bearing alloy for high-temperature application comprises, by weight, 2 to 8% Cr, 2 to 10% Fe, 0.1 to 1.5% Si, 2 to 22% Co, 1.4 to 11% Mo, and the balance of Ni and unavoidable impurities, and the bearing alloy includes the structure in which Co—Mo—Cr—Si-system hard particles of 5 to 35% by weight are dispersed in the matrix, so that the bearing alloy for high-temperature application can have excellent oxidation resistance even if the hot-compressing process after sintering is omitted, and can have excellent wear resistance while decreasing wear loss of the shaft. According to the second feature, 1.5 to 5% BN by weight is added to the bearing alloy according to the first feature, so that seizure with forming dies during powder molding can be prevented, thereby facilitating the manufacture of this bearing alloy for high-temperature application.

According to the third feature, the bearing formed of the bearing alloy according to the first or second feature, and the shaft having a hardness of Hv 100 to 300 which is supported by the bearing, are combined into the sliding material for high-temperature application, so that this sliding material can exhibit the effect of decreasing wear loss of the mating shaft according to the first or second feature most remarkably.

EXAMPLE

Specimens of the invention will now be described.

In order to manufacture specimens of the invention and comparative specimens for experiments, the following powders of raw materials were mixed. A pure Ni powder had a particle size of minus 250 mesh (not more than 60 μm). An Fe—CR alloy powder had a particle size of minus 250 mesh (not more than 60 μm), and was composed of 46 weight percent Cr, and the balance of Fe and unavoidable impurities. A Co—Mo—Cr—Si alloy powder had a particle size of minus 100 mesh (not more than 150 μm), and was composed of, by weight, 28% Mo, 8.5% Cr, 2.5% Si, and the balance of Co and unavoidable impurities. A BN powder had an average particle size of 300 μm.

These raw material powders were mixed at compounding rates shown in Table 1, and mixed powders of specimens of the invention 1 to 11 and comparative specimens 12 to 19 which had compositions shown in Table 2 were prepared. During mixing, 1% zinc stearate was added to improve the forming ability. The mixed powders thus obtained were molded into circular solid bars having a diameter of 22 mm and a length of 50 mm under a compression pressure of 6 t/cm².

TABLE 1

| Type | No. | Pure Ni Powder | Fe—Cr Alloy Powder | Co—Mo—Cr—Si Powder | BN |
|---|---|---|---|---|---|
| Specimen | 1 | 82 | 8 | 10 | — |
| of | 2 | 78 | 12 | 10 | — |
| Invention | 3 | 74 | 16 | 10 | — |
|  | 4 | 72 | 8 | 20 | — |
|  | 5 | 68 | 12 | 20 | — |
|  | 6 | 79 | 8 | 10 | 3 |
|  | 7 | 75 | 12 | 10 | 3 |
|  | 8 | 71 | 16 | 10 | 3 |
|  | 9 | 69 | 8 | 20 | 3 |
|  | 10 | 65 | 12 | 20 | 3 |
|  | 11 | 74 | 16 | 10 | — |
| Comparative | 12 | 63 | 17 | 20 | — |
| Specimen | 13 | 50 | 30 | 20 | — |
|  | 14 | 60 | 35 | 5 | — |
|  | 15 | 40 | 25 | 35 | — |
|  | 16 | 22 | 58 | 20 | — |
|  | 17 | 47 | 30 | 20 | 3 |
|  | 18 | 57 | 35 | 5 | 3 |
|  | 19 | 37 | 25 | 35 | 3 |

TABLE 2

| Type | No. | Ni | Fe | Cr | Co | Mo | Si | BN |
|---|---|---|---|---|---|---|---|---|
| Specimen | 1 | Bal. | 2.6 | 4.4 | 6.0 | 3.2 | 0.4 | — |
| of | 2 | Bal. | 3.9 | 6.1 | 6.0 | 3.3 | 0.4 | — |
| Invention | 3 | Bal. | 5.2 | 7.9 | 6.0 | 3.5 | 0.3 | — |
|  | 4 | Bal. | 2.6 | 5.2 | 12.0 | 6.0 | 0.6 | — |
|  | 5 | Bal. | 3.9 | 7.0 | 12.0 | 6.2 | 0.7 | — |
|  | 6 | Bal. | 2.6 | 4.4 | 6.0 | 3.2 | 0.4 | 3 |
|  | 7 | Bal. | 3.9 | 6.1 | 6.0 | 3.3 | 0.4 | 3 |
|  | 8 | Bal. | 5.2 | 7.9 | 6.0 | 3.5 | 0.3 | 3 |
|  | 9 | Bal. | 2.6 | 5.2 | 12.0 | 6.0 | 0.6 | 3 |
|  | 10 | Bal. | 3.9 | 7.0 | 12.0 | 6.2 | 0.7 | 3 |
|  | 11 | Bal. | 5.2 | 7.9 | 6.0 | 3.5 | 0.3 | — |
| Comparative | 12 | Bal. | 5.4 | 9.3 | 12.2 | 6.3 | 0.8 | — |
| Specimen | 13 | Bal. | 9.5 | 15.1 | 12.2 | 6.8 | 1.0 | — |
|  | 14 | Bal. | 11.1 | 16.0 | 3.1 | 2.8 | 0.7 | — |
|  | 15 | Bal. | 8.0 | 14.1 | 21.4 | 10.8 | 1.3 | — |
|  | 16 | Bal. | 18.4 | 27.5 | 12.2 | 8.0 | 1.4 | — |
|  | 17 | Bal. | 9.5 | 15.1 | 12.2 | 6.8 | 1.0 | 3 |
|  | 18 | Bal. | 11.1 | 16.0 | 3.1 | 2.8 | 0.7 | 3 |
|  | 19 | Bal. | 8.0 | 14.1 | 21.4 | 10.8 | 1.3 | 3 |

The bars were heated to 500° C. for adequate dewaxing of zinc stearate, and thereafter sintered in an atmosphere of "$H_2+N_2$" at 1150° C. for one hour. Thus, specimens for the following tests were manufactured. Concerning an invention specimen 11, it was heated to 900° C. and hot-compressed under a compression pressure of 6 t/cm².

With the invention specimens 1 to 11 and the comparative specimens 12 to 19 thus obtained, hardness measurements, oxidation resistance tests and sliding properties tests were performed.

The hardness measurements were conducted at a room temperature (20° C.), 500° C. and 900° C., respectively. The resultant values of hardness (Hv) are shown in Table 3.

TABLE 3

| | | Hardness (Hv) | | |
|---|---|---|---|---|
| Type | No. | Room Temperature | 500° C. | 900° C. |
| Specimen | 1 | 100 | 65 | 51 |
| of | 2 | 113 | 73 | 53 |
| Invention | 3 | 121 | 78 | 60 |
|  | 4 | 133 | 94 | 68 |
|  | 5 | 136 | 100 | 74 |
|  | 6 | 87 | 60 | 43 |
|  | 7 | 95 | 65 | 45 |
|  | 8 | 110 | 71 | 50 |
|  | 9 | 115 | 84 | 57 |
|  | 10 | 120 | 93 | 61 |
|  | 11 | 127 | 83 | 69 |
| Comparative | 12 | 148 | 109 | 81 |
| Specimen | 13 | 161 | 127 | 88 |
|  | 14 | 170 | 130 | 90 |
|  | 15 | 183 | 136 | 93 |
|  | 16 | 190 | 141 | 100 |
|  | 17 | 153 | 120 | 81 |
|  | 18 | 160 | 121 | 83 |
|  | 19 | 162 | 119 | 83 |

As a result, it was found that the hardness (Hv) decreases as the temperature is raised, and that the hardness at 900° C. is as low as about half of the hardness at the room temperature. By comparing the invention specimens 1 to 3, 6 to 8 and the comparative specimens 12 to 14, it was found that the matrix becomes harder as the Fe or Cr content increases. By comparing the invention specimens 1 and 4 or 2 and 5, it was found that the alloy becomes harder as the amount of Co—Mo—Cr—Si-system hard particles increases. Moreover, it was found that 3% addition of BN lowers the hardness Hv.

In the oxidation resistance tests, the specimens were machined into a bearing shape having an outer diameter of 16 mm, an inner diameter of 10 mm and a length of 20 mm, and were maintained in the atmospheric air at 900° C. for 10, 20, 50, 100 hours. From increases in the weight, increase rates of the weights before and after heating, i.e., 100× ((weight after heating)–(weight before heating))/(weight before heating), were derived. The results are shown in Table 4.

TABLE 4

| Type | No. | Processing time (Temperature: 900° C.) | | | |
|---|---|---|---|---|---|
| | | 10 hours | 20 hours | 50 hours | 100 hours |
| Specimen of Invention | 1 | 0 | 0 | 0.1 | 0.1 |
| | 2 | 0 | 0.1 | 0.1 | 0.1 |
| | 3 | 0.1 | 0.1 | 0.1 | 0.1 |
| | 4 | 0.1 | 0.1 | 0.2 | 0.2 |
| | 5 | 0.2 | 0.2 | 0.3 | 0.3 |
| | 6 | 0.4 | 0.4 | 0.6 | 0.6 |
| | 7 | 0.4 | 0.5 | 0.6 | 0.6 |
| | 8 | 0.4 | 0.4 | 0.4 | 0.6 |
| | 9 | 0.5 | 0.5 | 0.6 | 0.8 |
| | 10 | 0.5 | 0.5 | 0.6 | 0.9 |
| | 11 | 0 | 0 | 0.1 | 0.1 |
| Comparative Specimen | 12 | 0.5 | 0.5 | 0.6 | 0.5 |
| | 13 | 0.4 | 0.4 | 0.5 | 0.5 |
| | 14 | 0.4 | 0.5 | 0.4 | 0.4 |
| | 15 | 0.5 | 0.6 | 0.6 | 0.6 |
| | 16 | 1.1 | 1.2 | 1.3 | 1.3 |
| | 17 | 0.4 | 0.5 | 0.5 | 0.5 |
| | 18 | 0.6 | 0.6 | 0.7 | 0.8 |
| | 19 | 0.6 | 0.7 | 0.9 | 1.0 |

In consequence, it was found that the weight increase rates of the invention specimens 1 to 5 after 100 hours are 0.1 to 0.3 and have more excellent oxidation resistances even if the hot-compressing process after sintering is omitted, as compared with the comparative specimens 12 to 16. By comparing the invention specimens 1 and 4 or 2 and 5, it was found that the alloy is oxidized more easily as the amount of Co—Mo—Cr—Si-system hard particles increases. However, it was found that the invention specimen 11 subjected to the hot-compressing process has a weight increase rate of 0.1 and is little oxidized. Moreover, the invention specimens 6 to 10 to which BN was added exhibited somewhat higher weight increase rates because BN is oxidized from a temperature of about 700° C.

In the sliding properties tests, the specimens were machined into test plates, and friction wear tests were conducted with these test plates and mating sliding members which were pins made of JIS SUS304 (comprising 9.3% Ni, 19% Cr, and the balance of Fe and unavoidable impurities) having a hardness of Hv 250, and having a diameter of 4 mm. While a load of 2 kg was applied to the pins, the pins were reciprocated at an average speed of 1 m/min. for one hour. The sliding properties tests were conducted at temperatures of 500° C. and 900° C. The results are shown in Table 5.

TABLE 5

| Type | No. | Friction Coefficient | | Pin Wear Volume (mm³) | |
|---|---|---|---|---|---|
| | | 500° C. | 900° C. | 500° C. | 900° C. |
| Specimen of Invention | 1 | 0.67 | 0.46 | 0.30 | 0.28 |
| | 2 | 0.66 | 0.48 | 0.44 | 0.32 |
| | 3 | 0.65 | 0.48 | 0.53 | 0.41 |
| | 4 | 0.68 | 0.42 | 0.81 | 0.68 |
| | 5 | 0.67 | 0.43 | 0.92 | 0.83 |
| | 6 | 0.82 | 0.59 | 0.32 | 0.30 |
| | 7 | 0.80 | 0.61 | 0.44 | 0.34 |
| | 8 | 0.78 | 0.63 | 0.54 | 0.45 |
| | 9 | 0.80 | 0.61 | 0.83 | 0.71 |
| | 10 | 0.81 | 0.62 | 0.93 | 0.87 |
| | 11 | 0.63 | 0.44 | 0.51 | 0.40 |
| Comparative Specimen | 12 | 0.64 | 0.43 | 1.05 | 0.95 |
| | 13 | 0.63 | 0.41 | 1.26 | 1.12 |
| | 14 | 0.81 | 1.13 | 1.21 | 1.11 |
| | 15 | 0.51 | 0.36 | 1.27 | 1.18 |
| | 16 | 0.63 | 0.48 | 1.30 | 1.21 |
| | 17 | 0.78 | 0.62 | 1.30 | 1.17 |
| | 18 | 0.88 | 1.20 | 1.28 | 1.16 |
| | 19 | 0.58 | 0.59 | 1.25 | 1.16 |

Coefficients of friction at 900° C. had a tendency to be lower than those at 500° C. However, large differences were not observed between the invention specimens 1 to 11 and the comparative specimens 12 to 19.

Moreover, it was found that the invention specimens cause smaller volumes of pin wear than the comparative specimens either at 500° C. or at 900° C., and that the invention specimens do not cause the mating shaft to wear.

What is claimed is:

1. A heat resistant bearing consisting essentially of a bearing alloy of 2 to 8% Cr, 2 to 10% Fe, 0.1 to 1.5% Si, 2 to 22% Co, 1.4 to 11% Mo, optionally 1.5 to 5% BN, and the balance of Ni and unavoidable impurities, in the form of an intermetallic compound dispersed in a matrix, said bearing comprising compressed and sintered powders which have not been hot-compressed following sintering, said intermetallic compound being in the form of hard particles of Co—Mo—Cr—Si in a proportion of 5 to 35 wt % to said matrix, and wherein the respective components of the intermetallic compound are also counted in the alloy composition, said bearing alloy having a hardness of Hv 87-136 at room temperature.

2. A bearing according to claim 1, wherein said powders are pure Ni powder, Fe—CR alloy powder, Co—Mo—Cr—Si alloy powder, and optionally a BN powder.

3. A bearing according to claim 1, wherein said Cr content is 5–7%.

4. A bearing according to claim 3, wherein said Fe content is 4–6%.

5. A combination of a bearing and a mating shaft supported by said bearing, said mating shaft having a hardness of Hv 100 to 300,
said bearing comprising a heat resistant bearing alloy of a sintered alloy material for high-temperature application essentially consisting of, by weight,
2 to 8% Cr,
2 to 10% Fe
0.1 to 1.5% Si,
2 to 22% Co,
1.4 to 11% Mo, and
the balance of Ni and unavoidable impurities, and
formed of powders by powder compression at room temperature and having a structure in which hard particles of Co—Mo—Cr—Si-system intermetallic compound are dispersed in the matrix in the proportion of 5 to 35 weight percent to the matrix, the respective component of the intermetallic compound being also counted in the alloy composition, which bearing alloy has a hardness of Hv 87-136 at room temperature, softer than said shaft hardness effective to result in a smaller wear loss of the mating shaft.

6. A combination according to claim 5 wherein said powders are pure Ni powder, Fe—CR alloy powder and Co—Mo—Cr—Si alloy powder.

7. A combination according to claim 5 wherein said Cr content is 5-7%.

8. A combination according to claim 7 wherein said Fe content is 4-6%.

9. A combination of a bearing and a mating shaft supported by said bearing, said mating shaft having a hardness of Hv 100 to 300, said bearing comprising a heat resistant baring alloy of a sintered alloy material for high temperature application essentially consisting of, by weight, 2 to 8% Cr, 2 to 10% Fe 0.1 to 1.5% Si, 2 to 22% Co, 1.4 to 11% Mo, and 1.5 to 5% BN, and the balance of Ni and unavoidable impurities, and formed of powders by powder compression at room temperature and having a structure in which hard particles of Co—Mo—Cr—Si-system intermetallic compound are dispersed in the matrix in the proportion of 5 to 35 weight percent to the matrix, the respective component of the intermetallic compound being also counted in the alloy composition, which bearing alloy has a hardness of Hv 87–136 at room temperature, softer than said shaft hardness, effective to result in a smaller wear loss of the mating shaft.

10. A combination according to claim 9 wherein said powders are pure Ni powder, Fe—CR alloy powder, Co—Mo—Cr—Si alloy powder, and a BN powder.

11. A combination according to claim 9 wherein said Cr content is 5-7%.

12. A combination according to claim 11 wherein said Fe content is 4-6%.

* * * * *